June 12, 1928.

G. W. MÜLLER 1,673,698

SYSTEM FOR RECTIFYING ALTERNATING CURRENTS

Filed Aug. 22, 1927

Inventor
Gustav W. Müller
by *his signature*
His Attorney

Patented June 12, 1928.

1,673,698

UNITED STATES PATENT OFFICE.

GUSTAV W. MÜLLER, OF CHARLOTTENBURG, GERMANY, ASSIGNOR TO GENERAL ELECTRIC COMPANY, A CORPORATION OF NEW YORK.

SYSTEM FOR RECTIFYING ALTERNATING CURRENTS.

Application filed August 22, 1927, Serial No. 214,638, and in Germany October 5, 1926.

My invention relates to systems for rectifying alternating current, and has for its principal object the provision of an improved apparatus and method of control whereby the voltage of a rectifying system may be readily adjusted or regulated.

It has been proposed to adjust the voltage of a 2N phase transformer by changing the turns in the neutral connections of only one-half the phase windings and introducing into these adjustable connections an additional pressure of such a phase as to bisect the angle between two of the main phases. This additional voltage is produced by means of a supplementary transformer whose windings are in conducting connection with the secondary windings of the main transformer but are not inductively related thereto. Heretofore it has been customary to connect the primary side of both transformers to the alternating current supply circuit.

According to my invention, this known connection is improved by arranging the primary windings of the supplementary transformer so that they are not linked up with the A. C. mains, but with the secondary windings of the main transformer. This has the advantage that in adjusting the potential of the neutral-point a regulation of both the anode-voltage and the voltage of the primary winding in the additional transformer is simultaneously effected. By this means, the same regulation of the rectified voltage is secured with less regulating grades than if the primary winding of the additional or auxiliary transformer were connected with the supply network. In order to obtain a simple regulation of pressure, the tappings of the secondary windings of the auxiliary transformer may be connected to a "one-bar-switch."

My invention will be better understood from the following description when considered in connection with the accompanying drawings and its scope will be pointed out in the appended claims.

Figure 1:
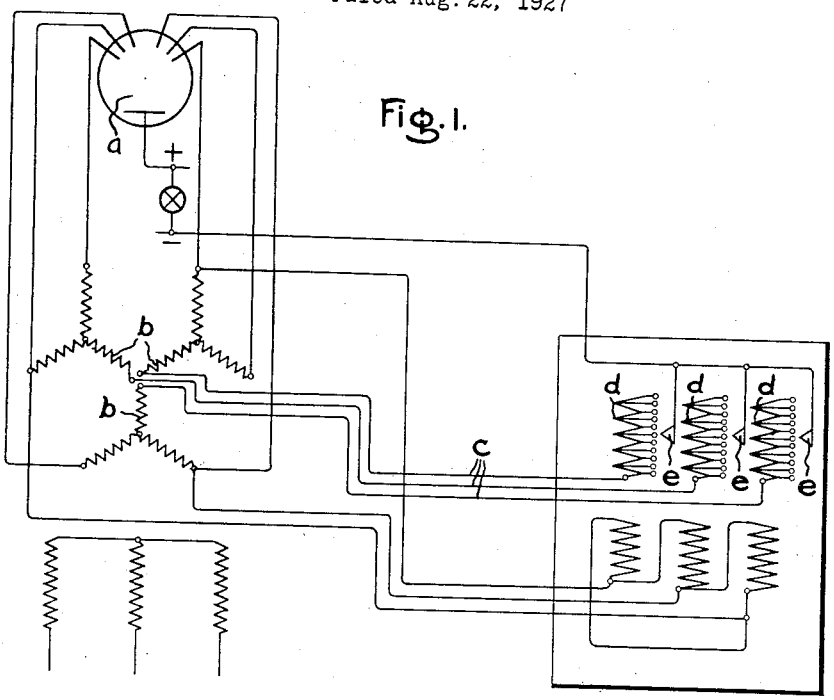
Figure 2:
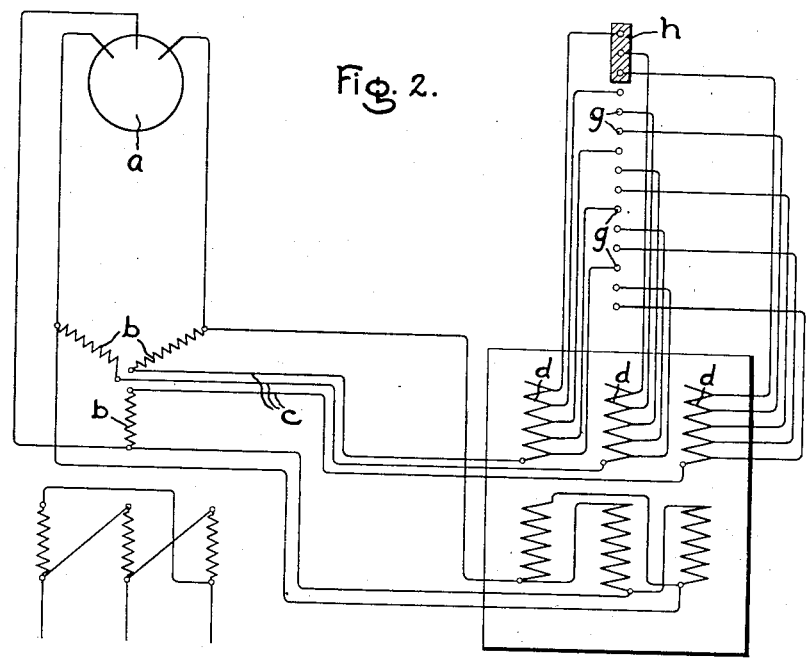

Two practical applications of the invention are represented in the drawing in Figs. 1 and 2.

As illustrated by Fig. 1, the secondary windings $b$ of the six-phase rectifier-transformer are connected in the usual way with the anodes of the rectifier $a$ and are provided with a three-phase neutral connection $c$ which leads to the secondary regulating windings $d$ of the supplementary transformer. The secondary windings $d$ of the auxiliary transformer have tappings which are connected with regulation contacts. The contacts $e$ of a regulation switch are arranged to engage these regulating contacts and are connected with each other by conductors to form the neutral point of the secondary windings $d$. According to the position of the contacts $e$ of the regulating switch, more or less turns of the secondary winding of the auxiliary transformer are connected in the circuit so that various D. C. voltages may be secured. Furthermore, at the same time the voltage of the primary side of the additional transformer is altered so that the advantage of a zero-point adjustment with less regulation grades is obtained than in a connection in which the primary side of the auxiliary transformer is connected with the alternating current supply circuit.

Fig. 2 shows a connection for a three-phase rectifier having the same effect as the one described above. The tappings of the three secondary windings $d$ of the auxiliary transformer are shown as connected with the contacts $g$ of a "one-line-switch" having a three-finger contact member $h$. On moving the triple finger contact member $h$ over the contacts $g$ of the one-bar-switch by one point, a new regulating position is obtained. Thus by providing, for example, 15 contacts as in the practical application, 15 regulating positions may be engaged by the one-bar-switch; this switch, of course, may just as well be made use of in the connection first described.

What I claim as new and desire to secure by Letters Patent of the United States, is:—

1. The combination of a main transformer comprising a 2N-phase secondary winding provided with neutral terminals and a neutral connection, and an N-phase auxiliary transformer provided with secondary windings connected between said neutral connection and neutral terminals and with a primary winding connected to alternate terminals of said 2N-phase winding.

2. The combination of a main transformer comprising a 2N-phase secondary winding provided with neutral terminals and a neutral connection, an N-phase auxiliary transformer provided with secondary windings connected between said neutral connection and neutral terminals and with a primary winding connected to alternate terminals of said 2N-phase winding, and means for adjusting the secondary turns of said auxiliary transformer.

3. The combination of a main transformer comprising a 2N-phase secondary winding provided with neutral terminals and a neutral connection, an N-phase auxiliary transformer provided with secondary windings connected between said neutral connection and neutral terminals and with a primary winding connected to alternate terminals of said 2N-phase winding and means for successively open-circuiting corresponding turns in the secondary winding of said auxiliary transformer.

4. The combination of a rectifier comprising a cathode and a plurality of anodes, a main transformer provided with polyphase terminals connected to said anodes and with neutral terminals, and an auxiliary transformer provided with secondary windings arranged to be connected between said neutral terminals and said cathode and with primary windings so connected to said polyphase terminals that the voltages of said transformers are displaced in phase by one-half the phase difference between said polyphase terminals.

5. The combination of a rectifier comprising a cathode and a plurality of anodes, a main transformer provided with polyphase terminals connected to said anodes and with neutral terminals, and an auxiliary transformer provided with secondary windings arranged to be connected between said neutral terminals and said cathode and with primary windings so connected to said polyphase terminals that the voltages of said transformers are displaced in phase by one-half the phase difference between said polyphase terminals, and means for adjusting the secondary turns of said auxiliary transformer.

In witness whereof, I have hereto set my hand this 28th day of July, 1927.

GUSTAV W. MÜLLER.